United States Patent [19]

Runyan

[11] Patent Number: 4,502,418
[45] Date of Patent: Mar. 5, 1985

[54] ANIMAL AND BIRD RESTRAINER

[75] Inventor: William S. Runyan, Ames, Iowa

[73] Assignee: Iowa State University Research Foundation, Inc., Ames, Iowa

[21] Appl. No.: 439,767

[22] Filed: Nov. 8, 1982

[51] Int. Cl.³ .......................... A01K 37/00; A22B 1/00
[52] U.S. Cl. .................................. 119/97 R; 119/98; 17/44
[58] Field of Search ................. 119/97 R, 96, 98, 103; 17/44 R, 44.1, 44.2, 44.3, 11, 24; 294/79, 74, 58

[56] References Cited

U.S. PATENT DOCUMENTS

| | | | |
|---|---|---|---|
| 1,166,382 | 12/1915 | Morse | 17/44.3 |
| 2,438,608 | 3/1948 | Johnson | 17/44.1 |
| 2,533,941 | 12/1950 | Johnson | 17/44.1 |
| 2,632,201 | 3/1953 | Van Dolah | 17/44.1 |
| 2,713,325 | 7/1955 | Bowers | 119/97 R |
| 2,731,665 | 1/1956 | Zebarth | 17/44.1 |
| 2,772,910 | 12/1956 | Doyle | 294/58 |
| 3,137,030 | 6/1964 | Varner | 17/44.2 |
| 3,188,130 | 6/1965 | Pietrowicz | 294/74 |
| 3,530,834 | 9/1970 | Hollenback | 119/96 |
| 4,223,639 | 9/1980 | Korkowski | 119/98 |
| 4,338,703 | 7/1982 | Tanner | 294/79 X |
| 4,346,499 | 8/1982 | Young | 17/44.3 |
| 4,378,759 | 4/1983 | Garrett | 119/98 |

Primary Examiner—Hugh R. Chamblee
Attorney, Agent, or Firm—Zarley, McKee, Thomte, Voorhees & Sease

[57] ABSTRACT

An animal and bird restrainer is disclosed which is adapted to support the legs of the animal or bird to facilitate the cleaning or skinning of the same. The device comprises an elongated block which is maintained in a substantially horizontal position by a pair of chains extending upwardly from the opposite ends thereof. A plurality of horizontally disposed and spaced-apart holes are formed in the block adjacent each of the ends. A first U-shaped bolt member selectively horizontally adjustably mounted in the holes at one end of the block and a second U-shaped bolt member is selectively horizontally adjustably mounted in the holes at the other end of the block. Each of the bolt members have a pair of horizontally disposed legs which extend through the holes. The U-bolt members may be extended through various pair of the holes to selectively adjust the spacing between the bolt-members to accommodate birds or animals of different sizes. A knife holder is provided on the block between the ends thereof.

9 Claims, 3 Drawing Figures

ANIMAL AND BIRD RESTRAINER

BACKGROUND OF THE INVENTION

This invention relates to an animal and bird restrainer and more particularly to an animal and bird restrainer to support the animal or bird during the cleaning or skinning thereof.

Many types of devices have been previously provided in an effort to suitably restrain or support wild game such as an animal or bird in position to facilitate the cleaning or skinning thereof. However, the prior art devices are either too large and cumbersome or are not adjustable for various animal sizes. Additionally, most of the prior art devices restrain the legs of the animal by piercing the same which causes damage to the fur of the furbearing animals.

Therefore, it is a principal object of the invention to provide an improved animal and bird restrainer.

A further object of the invention is to provide an animal and bird restrainer including means for supporting the legs of the animal or bird which does not damage the legs of the animal or bird being held thereby.

Still another object of the invention is to provide an animal and bird restrainer including horizontally adjustable U-bolts mounted in a block whereby the device will accommodate different animal or bird sizes.

Still another object of the invention is to provide an animal and bird restrainer which is ideally suited for small game and which is easy to use.

Still another object of the invention is to provide an animal and bird restrainer which is economical of manufacture and durable in use.

These and other objects will be apparent to those skilled in the art.

SUMMARY OF THE INVENTION

Figure 1:
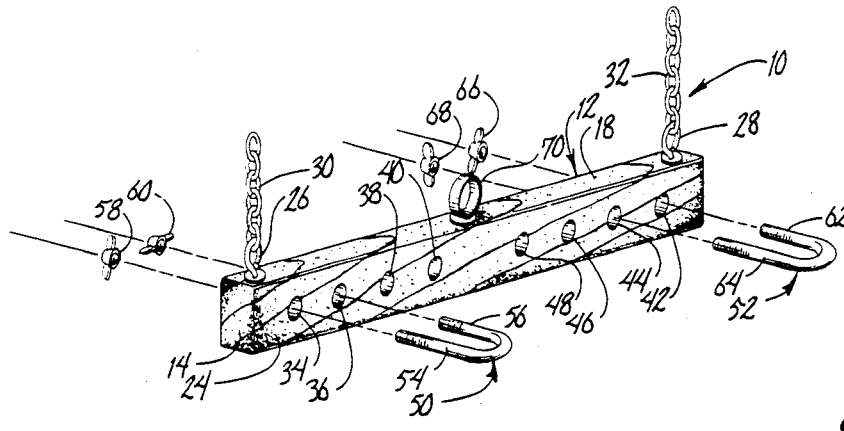
FIG. 1 is an exploded perspective view of the restrainer of this invention.
Figure 2:
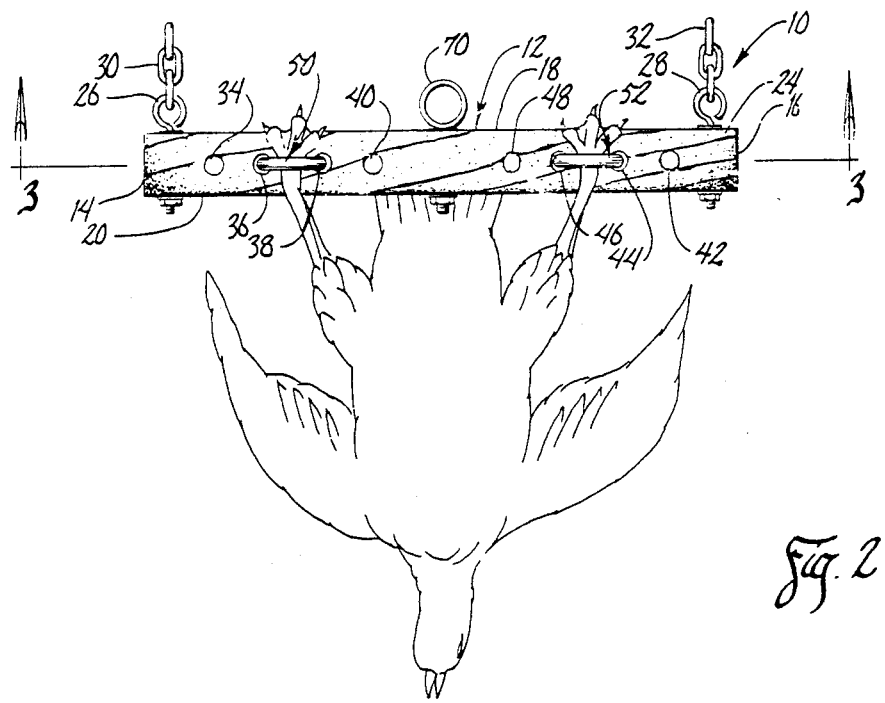
FIG. 2 is a side view of the restrainer illustrating a bird being held thereby.
Figure 3:
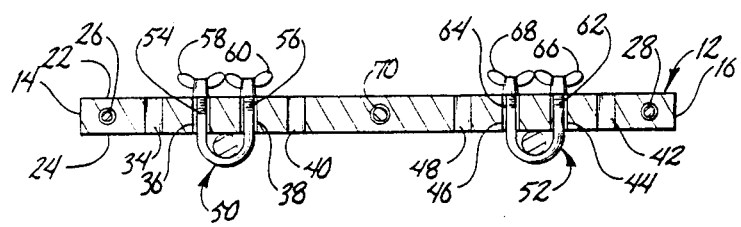
FIG. 3 is a top elevational view of the restrainer of this invention.

A restrainer is described which may be used to facilitate the cleaning or skinning of small game such as a bird or an animal. The restrainer comprises an elongated block which is held in a substantially horizontal position by a pair of chains extending upwardly from the opposite ends thereof. At least four horizontally disposed and spaced-apart holes are provided in the block adjacent each end thereof. A first U-bolt member is selectively horizontally positioned in a pair of the holes at one end of the block and a second U-bolt member is selectively horizontally mounted in a pair of the holes at the other end of the block. The legs of the bird or animal are extended through the U-bolt members which are then tightened to positively restrain the legs of the animal without damaging the same. A knife holder is provided on the block between the ends thereof.

DESCRIPTION OF THE PREFERRED EMBODIMENT

The animal and bird restrainer of this invention is referred generally by the reference numeral 10. Restrainer 10 includes an elongated block 12 having ends 14 and 16, top 18, bottom 20, and opposite sides 22 and 24.

A pair of connectors 26 and 28 are provided on the block 12 to facilitate the block 12 being supported in a substantially horizontal position by a pair of chains 30 and 32. Chains 30 and 32 would be secured to a convenient support such as a tree branch or the like. Horizontally disposed and spaced-apart holes 34, 36, 38 and 40 are formed in the block 12 adjacent end 14 as seen in the drawings. Horizontally disposed and spaced-apart holes 42, 44, 46 and 48 are formed in block 12 adjacent end 16 as also seen in the drawings.

The numerals 50 and 52 designate U-bolts designed to secure or restrain the legs of the animal or bird as will be described in more detail hereinafter. U-bolt 50 includes legs 54 and 56 having threaded portions at the ends thereof which are adapted to threadably receive wing-nuts 58 and 60 thereon respectively. U-bolt 52 includes legs 62 and 64 having threaded portions of the ends thereof adapted to threadably receive wing-nuts 66 and 68 respectively. A knife holder 70 is provided on the block 12 between the ends thereof and is comprised of a spring clip adapted to receive and yieldably retain the blade of a skinning or cleaning knife.

In use, the block 12 would be suspended in a substantially horizontal position from a tree or the like by means of the chains 30 and 32. The U-bolts 50 and 52 are mounted in the holes at each end of the block and are maintained therein by the wing-nuts previously described. The distance between the holes at each end of the block corresponds to the distance between the legs of each of the U-bolts to enable the U-bolts to be selectively positioned in various pairs of the openings. For example, legs 54 and 56 may be inserted through holes 34 and 38 or holes 36 and 40. Likewise, legs 62 and 64 of U-bolt 52 may be inserted in either holes 42 and 46 or holes 44 and 48. The legs of the animal are extended between the legs of the U-bolts and the wing-nuts are tightened to positively maintain or restrain the legs of the animal against the side of the block without damaging the legs of the animal. The U-bolts positively restrain the legs of the bird or animal in a spaced-apart position to facilitate the cleaning or skinning of the animal. The knife holder 70 provides a convenient means for supporting the skinning or cleaning knife when it is not being used.

Thus it can be seen that the animal and bird restrainer of this invention accomplishes at least all of its stated objectives.

I claim:

1. An animal and bird restrainer, comprising, an elongated block having top, bottom and opposite end portions, means for holding said block in a substantially horizontal position, a plurality of horizontally disposed and spaced-apart holes in said block adjacent the ends thereof, a first U-shaped bolt member removably, selectively horizontally and adjustably mounted in the holes at one end of said block, a second U-shaped bolt member removably, selectively horizontally and adjustably mounted in the holes at the other end of said block, each of said bolt members having a pair of horizontally disposed legs which extend through said holes, and means on the ends of said legs to adjustably support said U-bolt members with respect to said block.

2. The device of claim 1 wherein said means on the ends of said legs comprise threaded nuts.

3. The device of claim 1 wherein said means for holding said block in a substantially horizontal position comprises a pair of horizontally spaced and vertically disposed chain members.

4. The device of claim 1 wherein at least four holes are provided at each end of said block, the distance between the holes at each end being equal to the distance between said legs of said U-bolt member.

5. The device of claim 1 wherein the distance between said pair of legs of said bolt member is less than the width of the animal's foot.

6. The device of claim 1 wherein said bolt member has an integrally formed web interconnecting said pair of legs whereby a leg of an animal is received between said pair of legs of said bolt member and is clamped between said web and said block when said means on the ends of said legs are tightened.

7. The device of claim 1 wherein a knife holder is mounted on said block between the ends thereof.

8. The device of claim 7 wherein said knife holder comprises a spring clip means adapted to receive and yieldably retain the blade of a knife therein.

9. An animal and bird restrainer, comprising,
an elongated block having top, bottom and opposite end portions,
means for holding said block in a substantially horizontal position,
a plurality of horizontally disposed and spaced-apart holes in said block adjacent each end thereof,
a first U-shaped bolt member selectively horizontally adjustably mounted in the holes at one end of said block,
a second U-shaped bolt member selectively horizontally adjustably mounted in the holes at the other end of said block,
each of said bolt members having a pair of horizontally disposed legs which extend through said holes, the distance between said holes at each end of said block being equal to the distance between said legs,
and means on the ends of said legs to adjustably support said U-bolt members with respect to said block.

* * * * *